United States Patent [19]
Kitagawa et al.

[11] Patent Number: 5,622,025
[45] Date of Patent: Apr. 22, 1997

[54] PACKAGE TRANSPORTING AND LOADING SYSTEM

[75] Inventors: Kazumi Kitagawa; Atsushi Fujiwara, both of Shiga, Japan

[73] Assignee: Ishida Co., Ltd., Kyoto, Japan

[21] Appl. No.: 207,959

[22] Filed: Mar. 9, 1994

[30] Foreign Application Priority Data

Mar. 9, 1993 [JP] Japan .................................. 5-076148

[51] Int. Cl.⁶ .................................................. B65B 57/00
[52] U.S. Cl. .................................. 53/53; 53/502; 53/143; 53/244; 53/544; 53/251; 198/403
[58] Field of Search ................................ 53/53, 234, 143, 53/244, 247, 249, 250, 251, 502, 531, 544; 198/402, 403; 914/758, 761, 763, 773, 727

[56] References Cited

U.S. PATENT DOCUMENTS

| | | |
|---|---|---|
| 1,887,211 | 11/1932 | Mortimer et al. |
| 3,837,474 | 9/1974 | Brooke et al. |
| 3,977,157 | 8/1976 | Davies et al. ............... 53/234 |
| 3,987,605 | 10/1976 | Johnson ...................... 53/234 |
| 3,992,855 | 11/1976 | Palmieri et al. ............. 53/234 |
| 4,050,574 | 9/1977 | Chenevard et al. .......... 414/763 |
| 4,559,757 | 12/1985 | Focke et al. ................. 53/234 |
| 4,800,703 | 1/1989 | Goodman ..................... 53/251 |
| 4,813,205 | 3/1989 | Mikata et al. ................ 53/53 |
| 4,864,801 | 9/1989 | Fallas ......................... 53/247 |
| 5,251,422 | 10/1993 | Goodman et al. ........... 53/251 |

FOREIGN PATENT DOCUMENTS

| | | |
|---|---|---|
| 0428361 | 5/1991 | European Pat. Off. . |
| 3906635 | 9/1990 | Germany . |
| 60-171803 | 11/1985 | Japan . |

*Primary Examiner*—John Sipos
*Assistant Examiner*—Gene L. Kim
*Attorney, Agent, or Firm*—Loeb & Loeb LLP

[57] ABSTRACT

A transport apparatus (C) for transporting products (X), supplied onto a lower transport path, successively to an upper transport path, and a loading apparatus for loading the products (X), which have been transported by the transport apparatus, into a receptacle (Y). The system includes a first transport mechanism (2) for transporting the products (X) towards a pick-up station (P2), a lifter mechanism (4) for holding the products (X), having been transported to the pick-up station (P2), and transferring the products (X) from the pick-up station (P2) towards a delivery station (P3) defined generally above the pick-up station (P2), and a second transport mechanism (5) for receiving the products (X), which have been transferred to the delivery station (P3) by the lifter mechanism (4), and transporting the products (X) towards a stand-by station (P4) defined above a loading station (P5) at which the bagged products are loaded into the receptacle (Y). The lifter mechanism (4) is provided with a holding unit (66 to 69) for holding the products (X) transported to the stand-by station (P4) and a rotary drive unit (60) for rotating the holding unit (66 to 69) to turn the products (X) upside down during the transfer of such products (X) from the pick-up station (P2) towards the delivery station (P3).

7 Claims, 11 Drawing Sheets

PACKAGE TRANSPORTING AND LOADING SYSTEM

BACKGROUND OF THE INVENTION

1. Field of the Invention

The present invention relates to a transport apparatus for transporting products, supplied onto a lower transport path, successively to an upper transport path positioned above the lower transport path and a loading apparatus utilizing the transport apparatus for loading the products into a receptacle, both of said transport apparatus and said loading apparatus being utilizable in a product transport system or a product delivery system.

2. Description of the Prior Art

An example of a packaging machine for packaging or bagging food items or industrial machine parts is disclosed in, for example, the Japanese Mid-open (Unexamined) Utility Model Publication No. 60-171803 published Nov. 14, 1985. This known packaging machine is of a design capable of performing a series of bag making, filing products into each bag and successively sealing the bags. More specifically, this packaging machine performs a process of folding a web of film, made of synthetic resin and drawn from a film roll disposed rearwardly upwardly of the body of the packaging machine, along a mid center line to bring opposite side edges thereof together, fusion-bonding the overlapping side edges of the web of film together (vertical sealing) to provide a tubular film, intermittently transporting the tubular film in a direction conforming to the longitudinal axis of the tubular film while sandwiching it in a direction widthwise thereof, and thermally sealing the tubular film at the sandwiched area (transverse or cross sealing) to provide a series of bags. By successively filling products into each bag through an upper open mouth thereof while the tubular film is intermittently transported with sandwiched at a lower portion in a direction widthwise, the bags of products filled therein can be successively manufactured. The bagged products manufactured by this known packaging machine are subsequently discharged from a front of the body of the packaging machine downwardly and, after the discharged bagged products have been loaded into a receptacle, for example, a carton box, in unit of a plurality of bags of products, the carton box is packaged and baled for shipment to the market.

When it comes to a filing the bagged products, such as manufactured by the above described packaging machine or the like, into a receptacle such as a cannon box, it is a general practice to allow the bagged products to fall downwardly towards the carton box along a downwardly inclined chute. The downwardly inclined chute is effective in that, where each bagged product has a substantial weight such as, for example, a bag of salt or sugar, the bagged products can slide downwardly along the chute stably under the influence of a gravitational force without substantially displacing in position and posture and be finally seated properly within the carton box to assume a predetermined lay-out inside the carton box.

However, the use of the downwardly inclined chute has been found problematic particularly where each bagged product is light-weight such as a bag of potato chips. More specifically, since the bag of potato chips is very light-weight, it tends to stand still halfway along the chute, or to be displaced in position and posture, during its slide down to the carton box, resulting in a change in orientation of the bagged product. In addition, with the light-weight bagged products, it may often occur that some of the light-weight bagged products are caught by a top peripheral edge defining an opening of the carton box with the orientation thereof consequently varied to such an extent that the bagged products may eventually placed inside the carton box in a disordered fashion. Thus, the use of the downwardly inclined chute has been considered ineffective, or difficult, to accomplish a stable and orderly supply of the light-weight bagged products assuredly into the carton box.

In view of the foregoing, automation of a series of transporting and packaging of the light-weight bagged products such as bags of potato chips has long been considered impossible, or at least difficult, to achieve and, therefore, it is a customarily accepted practice to load the light-weight bagged products manually into the carton box, accompanied by a reduction in work efficiency.

On the other hand, with the prior art packaging machine of the above discussed type, products are filled into each bag through a top opening thereof and the resultant bagged products are discharged successively downwardly. Accordingly, a delivery position onto which the bagged products are discharged from the packaging machine is defined at a location adjacent a ground floor. Because of this, the loading of the bagged products into the receptacle or carton box equally placed adjacent the ground floor cannot be accomplished with no difficulty. Therefore, where it is desired for the bagged products, discharged onto the delivery site adjacent the ground floor, to be automatically loaded into the carton box by the use of the chute, the packaging machine as a whole has to be installed at a level high above the ground floor, rendering a system of bagging (packaging), transporting and loading the products to become bulky in size requiring a relatively large dedicated space for installation. This imposes a limitation on the freedom of lay-out of the factory as a whole.

In view of the foregoing problems inherent in the prior art system, the inventors of the present invention has made an attempt to transport the bagged products, discharged onto the delivery site adjacent the ground floor, to a level high above the ground floor by the use of a transport apparatus such as, for example, a conveyor and then to load the bagged product from above into the receptacle placed at a location adjacent the ground floor. However, this attempt has been found requiring the use of the conveyor having such a substantial length as to result in an increased size of the automated transport and packaging system.

On the other hand, where the bagged product discharged from the packaging machine are received and transported by the transport apparatus such as, for example, a conveyor, to a loading station at which the bagged products are loaded the receptacle, the bagged products are generally transported with respective back faces thereof oriented upwardly. The back face of each bagged product has a longitudinal seal at which opposite side edges of a web of film have been thermally bonded together. The reason that the bagged products are generally transported with their back faces oriented upwardly will now be discussed.

As discussed hereinbefore, the prior art packaging machine performs a process of folding a web of resinous film along a mid center line to bring opposite side edges thereof frontwardly at the packaging machine, fusion-bonding the overlapping side edges of the web of film together to provide a tubular film having a longitudinal seal, intermittently transporting the tubular film while thermally sealing a transverse portion of the tubular film corresponding in position to the bottom of a bag, filling a quantity of products into the resultant bags and finally sealing a top opening of the filled bags before they are discharged frontwardly at the packaging machine onto the delivery site. Consequently, at the time the filled bags are discharged from the packaging machine, the respective back faces of the filled bags having the longitudinal seals are oriented upwardly. The face of each filled bag where the longitudinal seal is found is generally considered a back face, and indicia such as advertisements and manufacturer's identifications have been printed on each of the back and front faces of each filled bag.

Accordingly, as shown in FIG. 11, where the bagged products X discharged successively from the packaging machine (not shown) are to be transported onto a transport conveyor b through a guide member a, each bagged product X resting on the transport conveyor b is transported to a predetermined side, having its front and back faces X1 and X2 reversed with the back face X2 thereof oriented upwardly due to the peculiarity in structure. In such case, the bagged products X transported to the predetermined site are loaded into the carton box with their back faces X2 oriented upwardly. Because of this, it is a customary practice for the attendant worker to reverse the bagged products manually one by one at the predetermined site so that the back face of each bagged product can be oriented downwardly, i.e., towards the bottom of the carton box, thereby involving a considerable reduction in work efficiency.

It is often practiced to selectively use various receptacles or carton boxes of different sizes or capacities depending on the number and/or shape of the bagged products to be accommodated within the receptacles or carton boxes. In such case, in order to avoid the necessity of use of the receptacle or carton box of a relatively large size or capacity to accommodate a given number of the bagged products and to allow the given number of the bagged products to be packed compact within the receptacle or carton box of a given size or capacity, and also in order to facilitate a handling of the filled receptacles or carton boxes accommodating the bagged products, it has been desired that the bagged products can be automatically loaded into the receptacle or carton box with the orientation of some or all of the bagged products having been changed 90 degrees with its lengthwise and widthwise directions replaced with each other if appropriate or desired. The prior art has not yet reached to a level to provide a practically acceptable system effective to accomplish this desire.

In addition, when it comes to a loading of the bagged products, manufactured by the above described packaging machine, into the receptacle such as, for example, a carton box, in unit of a plurality of bagged products, a downwardly inclined chute is generally utilized to allow the bagged products to slide downwardly by the effect of a gravitational force from the packaging machine onto the receptacle. In this case, there is a possibility that some of the bagged products, which have been deemed unacceptable due to the bagged product containing an insufficient or excessive weight of products and/or containing foreign matter, may be loaded into the receptacle without being ejected. Because of this, where the chute is employed, a severe sorting job is required to select only the acceptable bagged products while ejecting the unacceptable bagged products. In addition, where a sorting mechanism for this purpose is to be assembled, it has long been a problem to assembly the sorting mechanism compact and reliable in operation.

SUMMARY OF THE INVENTION

Therefore, a primary object of the present invention is to provide an improved transport apparatus of a compact structure capable of transporting the bagged products, supplied onto a lower transport path, successively to an upper transport path positioned above the lower transport path while permitting each bagged product to be turned upside down during the transport thereof.

Another important object of the present invention is to provide an improved automatic transport and loading system of a compact design utilizing the transport apparatus of a type referred to above effective to transport and load even the light-weight bagged products in an orderly rectified fashion into a receptacle which has hitherto been considered difficult to achieve.

A further object of the present invention is to provide an improved transport and loading system including a sorting mechanism operable to sort the bagged products between acceptable and unacceptable ones so that only the acceptable bagged products can be loaded into the receptacle.

In order to accomplish the first mentioned object of the present invention, the present invention provides a transport apparatus for transporting products, supplied onto a lower transport path, successively to an upper transport path, which comprises a first transport means defining the first transport path and for transporting the products received at a first station towards a second station, a lifter means for holding the products, having been transported to the second station, and transferring the products from the second station towards a third station defined generally above the second station, and a second transport means for receiving the products, which have been transferred to the third station by the lifter means, and transporting the products towards a fourth station. The lifter means includes a holding means for holding the products transported to the second station and a rotary drive means for rotating the holding means to turn the products upside down during the transfer of such products from the second station towards the third station.

With this transport apparatus, since the lifter means rotates the holding means to transfer the products, transported to the second position, that is, a lower position below the lifter means, to the third position, that is, an upper position above the lifter means, there is no need to employ any transport conveyor having a substantial length to transfer the product from the lower position to the upper position high above the lower position. Accordingly, the transport apparatus as a whole can be assembled compact in size. Also, during the transfer of the product from the lower position towards the upper position, each product is turned upside down with its back face oriented downwardly and, therefor, the products transferred to the second or upper position can be transported by the second transport means with their back faces oriented downwardly.

In order to accomplish the second mentioned object of the present invention, the present invention also provides an improved package transporting and loading system for successively transporting bagged products and loading such bagged products into a receptacle, which comprises a first transport means defining a first transport path extending from a product receiving station to a pick-up station, said bagged products being delivered onto the first transport means at the receiving station, a lifter means for holding the products, having been transported to the pick-up station, and transferring the products from the pick-up station towards a delivery station defined generally above the pick-up station, a second transport means defining a second transport path extending from the delivery station to a stand-by station, defined above a loading station, for transporting the products, which have been transferred to the delivery station by the lifter means, towards the stand-by station, a receiving means disposed at the stand-by station for receiving the bagged products transported by the second transport means, and a loading means for holding the bagged products, blocked at the stand-by station by the receiving means, and then loading the bagged products into a receptacle positioned at a loading station. For the lifter means, the package transport and loading system makes use of the lifter means of a type employed in the above described transport apparatus.

With this construction of the package transporting and loading system, the bagged products discharged from the packaging machine are successively transported to the stand-by station by means of the transport means and the lifter means, not through the chute, and are then loaded into the receptacle at the loading station. Therefore, even the light-weight bagged products, which have hitherto been considered difficult to transport orderly into the receptacle because of any possible displacement in position and posture taking place in the light-weight bagged products during the transportation thereof, can be automatically transported and loaded into the receptacle without substantially requiring a manual intervention, thereby increasing the work efficiency.

Also, since the bagged products discharged from the packaging machines are loaded into the receptacle after they have once been transferred upwardly, and unlike the case in which the bagged products delivered onto a lower position adjacent the ground floor are supplied into the receptacle positioned further below such lower position through the use of the chute, the packaging machine need not be installed at a position considerably high above the ground floor. Accordingly, an automated production lines from manufacture of the bagged products by the packaging machine to a loading of the bagged products into the receptacles can be designed compact in size.

Furthermore, since the use of the lifter means advantageously dispenses with the use of the transport conveyor of a substantial length and is effective to shift the bagged products upwardly, the system as a whole can further be reduced in size. In addition, since each bagged product is turned upside down with its back face oriented downwardly during the transfer thereof by the lift means from the pick-up station towards the delivery station, the bagged products can advantageously loaded into the receptacle with their front faces oriented upwardly.

Again, in order to accomplish the third mentioned object of the present invention, the present invention provides an improved package transporting and loading system for successively transporting bagged products and loading such bagged products into a receptacle, which comprises the first transport means, the lifter means, the second transport means, the receiving means and the loading means all of which are provided in the above-mentioned package transporting and loading system to accomplish the second mentioned object of the present invention.

This package transporting and loading system designed to accomplish the third mentioned object of the present invention also comprises a shutter means disposed at a location adjacent a leading end of the first transport path with respect to a direction of transport of the bagged products and capable of assuming one of an ejecting position, in which the bagged products are ejected from the first transport path, and a holding position in which the bagged products are retained on the first transport path, at least one of an improperly bagged product detecting means for detecting some of the bagged products being transported along the first transport path, which are improperly bagged, a weight detecting means for detecting some of the bagged products which contain an insufficient or excessive amount of products, and a foreign matter detecting means for detecting containment of foreign matter in the bagged products, being disposed at a location along the first transport path, and a shutter switching means for switching the shutter means over to the ejecting position when said at least one of the detecting means detects the improperly bagged product, the bagged product containing an insufficient or excessive amount of products or the bagged product containing the foreign matter.

With this construction, not only can the bagged products be automatically loaded into the receptacle in an orderly rectified fashion, but also there is no need to install the packaging machine at a position spaced a considerable distance upwardly from the ground floor as hereinbefore described, the entire automated production lines from manufacture of the bagged products by the packaging machine to a loading of the bagged products into the receptacles can be designed compact in size. In addition, only the acceptable bagged products substantially free from the improper seal, a deviation in weight and/or containment of foreign matter can be loaded into the receptacle, ensuring a high reliability in quality or weight of each bagged product.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

Figure 1:
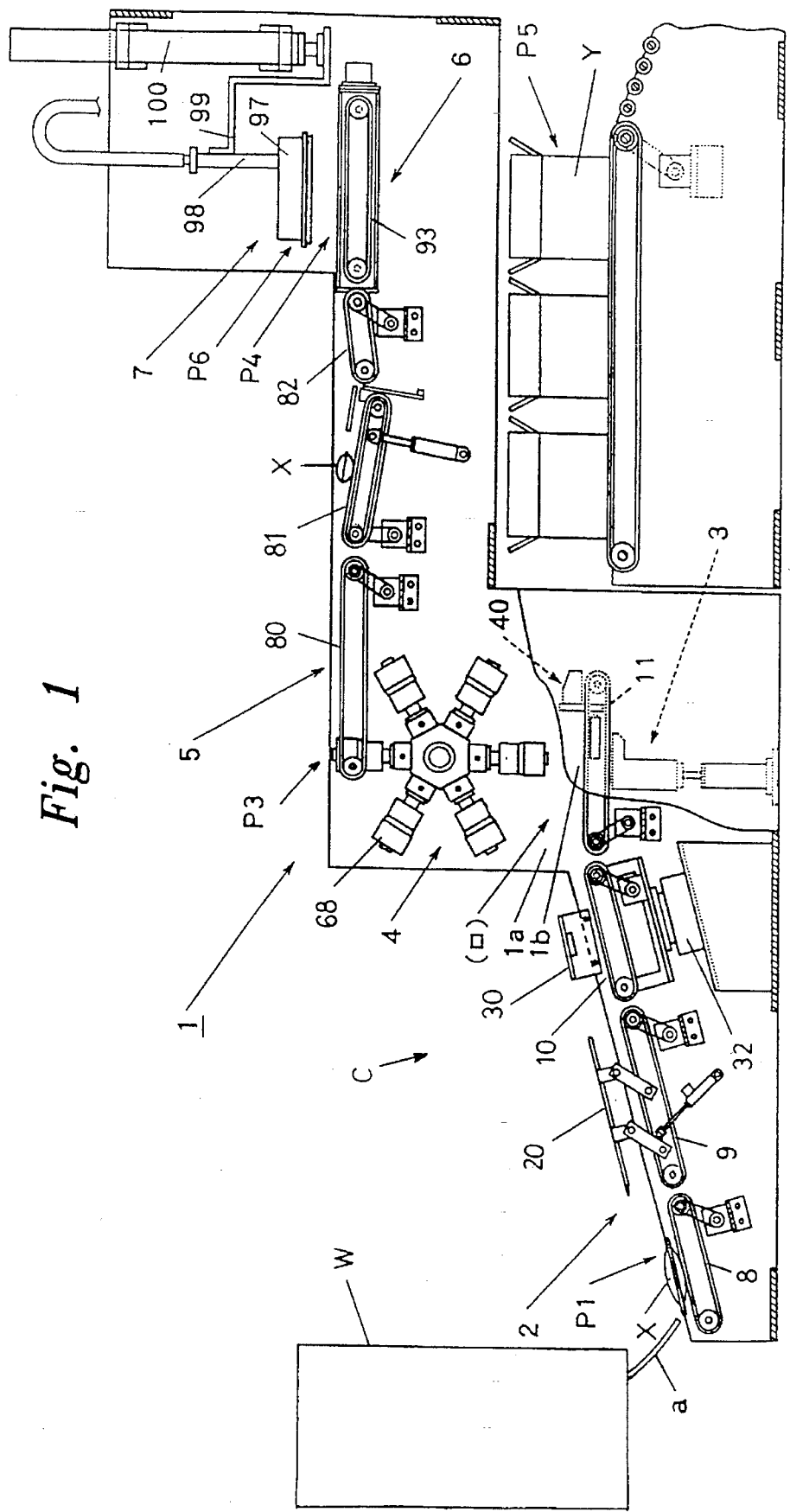
FIG. 1 is a schematic side view of a package transporting and loading system according to the present invention.

As shown in FIG. 1 showing an entire perspective view of a package transporting and loading system in a schematic side representation, the package transporting and loading system generally identified by 1 includes a packaging machine W of a type disclosed in, for example, the aforementioned Japanese Mid-open Utility Model Publication No. 60-171803. The packaging machine W is designed to manufacture bagged products by filling a predetermined quantity of items such as, for example, potato chips, into bags and sealing the resultant bags of the items and then to discharge the bagged products successively along a guide a with a back face of each bagged products oriented upwardly. The bagged products X successively discharged onto the guide a from the packaging machine W are received at a receiving station (a first station) P1 by the package transporting and loading system which will now be described.

The package transporting and loading system 1 shown therein comprises a first transport mechanism 2 for transporting the bagged products X, received at the receiving station P1 from the guide a, towards a pick-up station (a second station) P2; an elevating mechanism 3 positioned at the pick-up station P2 for elevating the bagged products X which have been successively transported to the pick-up station P2 by the first transport mechanism 2; a lifter mechanism 4 positioned at the pick-up position and above the elevating mechanism 3 for transferring the bagged products X one by one from the elevating mechanism 3 to a delivery station (a third station) P3 upwardly away from the elevating mechanism 3 while sucking the respective bagged product X by the effect of a vacuum suction force; a second transport mechanism 5 for transporting the bagged products X, which have been transferred from the pick-up station P2 by the lifter mechanism 4, successively from the delivery station P3 towards a stand-by station (a fourth station) P4 defined above a packaging station (a fifth station) P5; a receiving mechanism 6 operable in one of a closed position, in which the bagged products X transported by the second transport mechanism 5 are temporarily retained, and an open position in which the bagged products X can be discharged downwardly towards the packaging station P5; and a loader mechanism 7 movable between an upwardly shifted position P6, defined above the stand-by station P4, and the loading station P5 and operable to load the bagged products X from the stand-by station P4 into a receptacle such as, for example, a carton box Y held at the loading station P5 by holding the bagged products X under suction. These mechanisms 2 to 7 are positioned and supported between side frame structures 1a and 1b forming parts of the package transporting and loading system 1.

A transport apparatus C embodying the present invention includes the first and second transport mechanism 2 and 5 and the lifter mechanism 4. In any event, each of the various mechanisms 2 to 7 will be described in detail.

Figure 2:
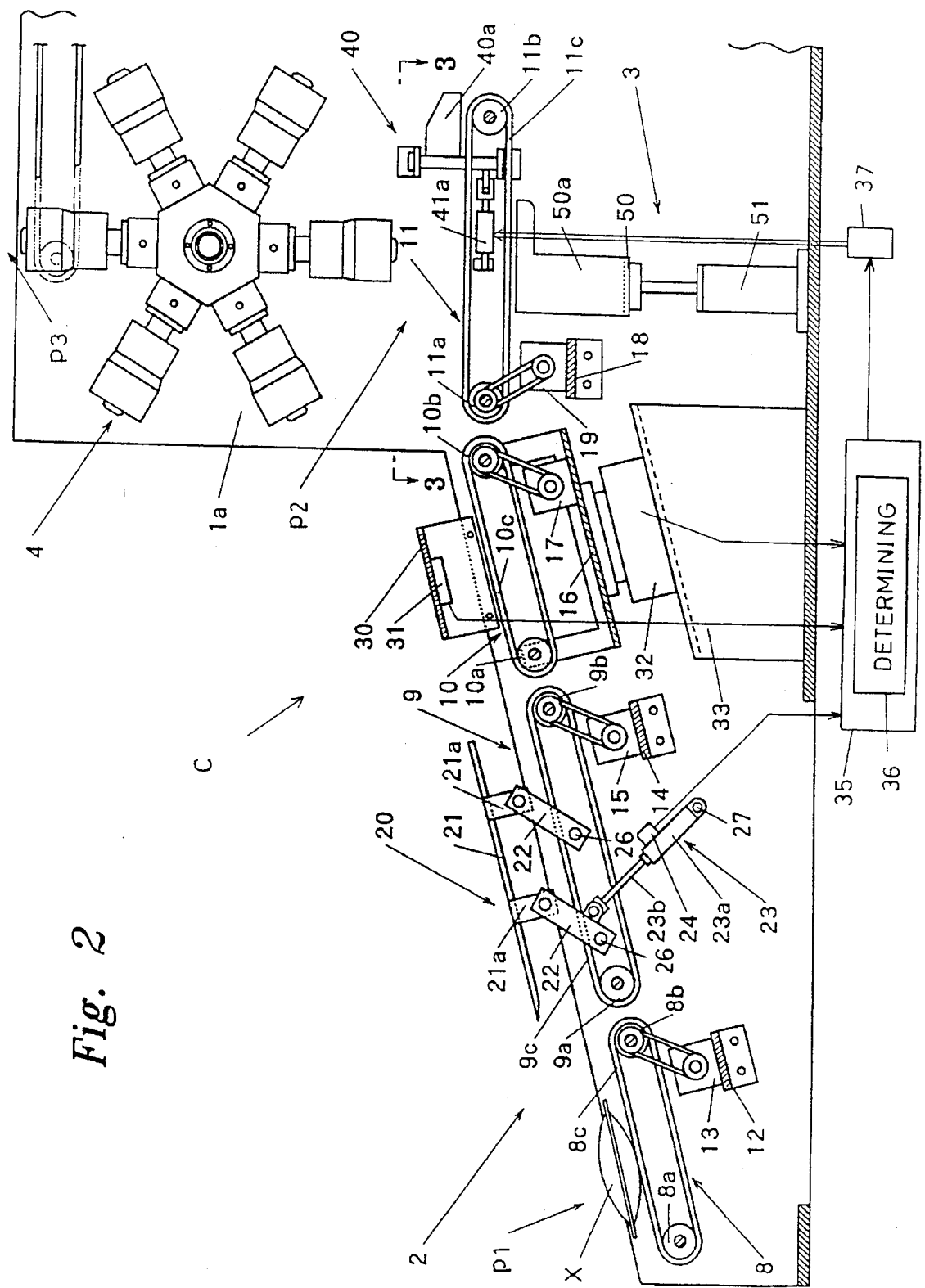
FIG. 2 is a schematic side view, on an enlarged scale, showing a first transport mechanism employed in the package transporting and loading system shown in FIG. 1.

Referring first to FIG. 2, the first transport mechanism 2 includes, as shown therein on an enlarged scale, first to fourth transport conveyors 8 to 11 for transporting the bagged products X successively from the receiving station P1 towards the pick-up station P2, said first to fourth transport conveyors 8 to 11 defining a first transport path. The first transport conveyor 8 positioned at the receiving station P1 comprises a pair of rollers 8a and 8b rotatably supported between the machine side frame structures 1a and 1b, an endless conveyor belt 8c such as, for example, an endless tinting belt, trained between the rollers 8a and 8b, and a drive motor 13 supported by and mounted on a bracket 12 extending fixedly between the machine side frame structures 1a and 1b for driving one of the rollers, for example, the roller 8b. Similarly, the second transport conveyor 9 positioned between the first and third transport conveyors 8 and 10 and includes a pair of rollers 9a and 9b rotatably supported between the machine side frame structures 1a and 1b, an endless conveyor belt 9c such as, for example, an endless timing belt, trained between the rollers 9a and 9b, and a drive motor 15 supported by and mounted on a bracket 14 extending fixedly between the machine side frame structures 1a and 1b for driving one of the rollers, for example, the roller 9b.

The third transport conveyor 10 includes a pair of rollers 10a and 10b rotatably supported by opposite side walls of a support bracket 16 disposed between the machine side frame structures 1a and 1b, an endless conveyor belt 10c such as, for example, an endless timing belt, trained between the rollers 10a and 10b, and a drive motor 17 mounted on the support bracket 16 for driving one of the rollers, for example, the roller 10b. The fourth transport conveyor 11 likewise includes a pair of rollers 11a and 10b rotatably supported between the machine side frame structures 1a and 1b, a plurality of laterally equally spaced, juxtaposed endless conveyor belts 11c (best shown in FIG. 3) such as, for example, endless timing belts, trained between the rollers 11a and 11b, and a drive motor 19 supported and mounted on a bracket 18 extending fixedly between the machine side frame structures 1a and 1b for driving one of the rollers, for example, the roller 11a.

The second transport conveyor 9 also includes a seal checker 20 for monitoring the bagged products X, then successively transported by the second transport conveyor 9, to detect the presence of a bagged product which is improperly scaled. Positioned above the third transport conveyor 10 is a mounting bracket 30 straddling the third transport conveyor 10. This mounting bracket 30 carries a metal detector 31 secured to an undersurface of the mounting bracket 30 for detecting containment of metallic material in the bagged product X then transported by the third transport conveyor 10. Positioned beneath the third transport conveyor 10 is a weigher 32 serving as a weight checker for detecting whether or not the bagged product X then transported by the third transport conveyor 10 is overweighed or underweight, that is, whether or not the weight of that bagged product X departs from a predetermined weight.

The seal checker 20 referred to above includes a generally elongated presser plate 21 disposed immediately above the endless conveyor belt 9c of the second transport conveyor 9 for pressing the bagged product X then carried by the endless conveyor belt 9c, a pair of links 22 disposed on each side of the second transport conveyor 9 and pivotally connected at their lower end to the adjacent machine side frame structure 1a or 1b by means of respective pivot shafts 26 and at their upper end to a corresponding pair of legs 21a integral with the presser plate 21, a drive cylinder 23 including a cylinder body 23a having a lower end pivotally connected to the adjacent machine side flame structure 1b by means of a pivot shaft 27 and a piston rod 23b operatively protruding outwardly from the cylinder body 23a and having a free end pivotally coupled with one of the links 22, and an encoder 24 for measuring an operating stroke of the piston rod 23b. This seal checker 20 is so designed that, when the drive cylinder 23 is operated with the piston rod 23b retracted inwardly of the cylinder body 23a to pivot the paired links 22 in a predetermined direction, the presser plate 21 applies a predetermined pressure to the bagged product X then carried by the endless conveyor belt 9c to press such bagged product X. The encoder 24 then measures the stroke of actual movement of the piston rod 23b to determine, based on the measured stroke of actual movement of the piston rod 23b, if such bagged product X is improperly sealed.

The weigher 32 positioned beneath the third transport conveyor 10 is fixedly mounted on a base 33 disposed between the machine side frame structures 1a and 1b and has a support bracket 16 positioned on an upper end thereof for supporting the third transport conveyor 10 in its entirety so that the weight of the bagged product X then transported by the third transport conveyor 10 can be detected to determine if such bagged product X is overweighed or underweight.

Figure 3:
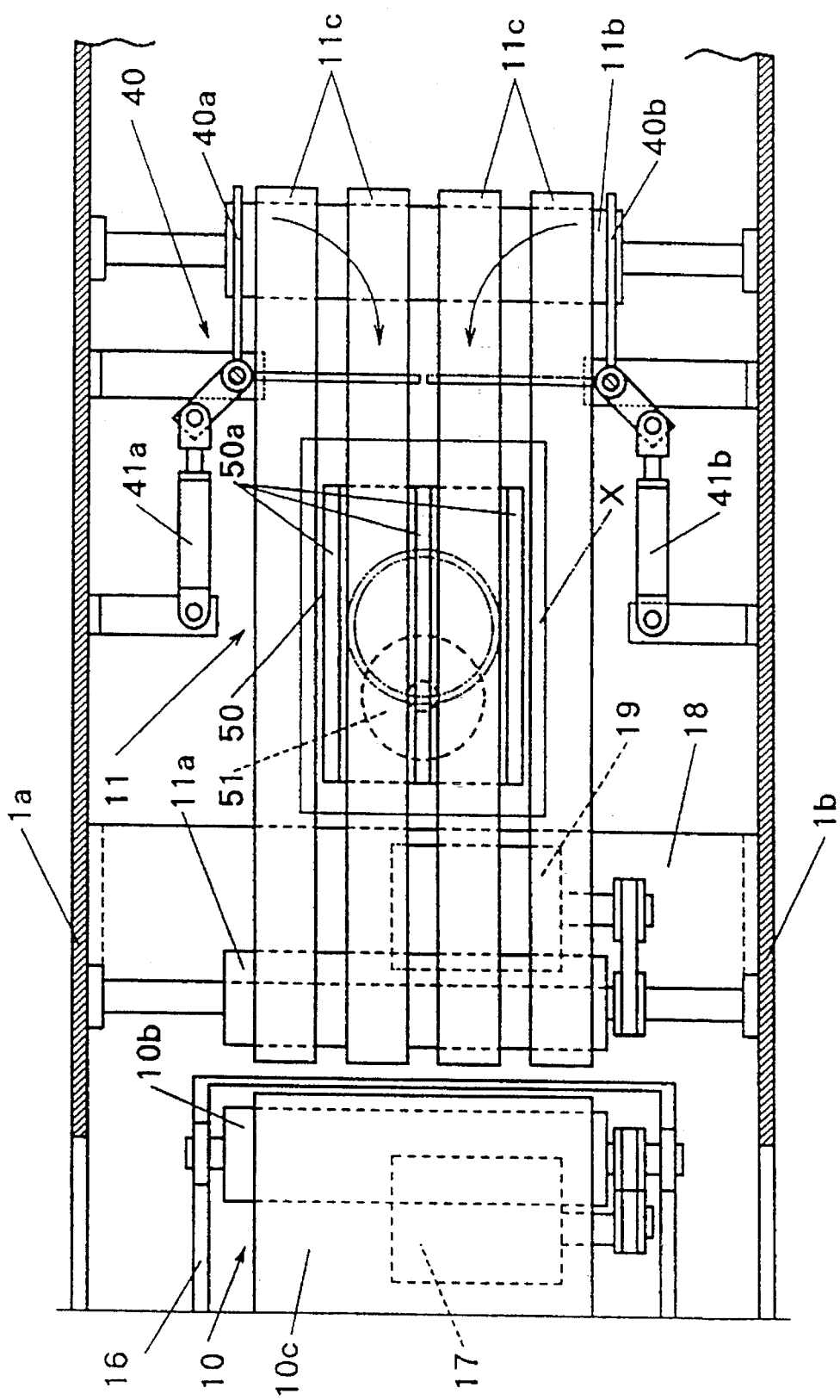
FIG. 3 is a fragmentary enlarged cross-sectional view taken along the line 3—3 in FIG. 2.

As best shown in FIGS. 2 and 3, a shutter mechanism 40 is disposed on one side of the third transport conveyor 10 remote from the third transport conveyor 10, that is, adjacent a leading end of the fourth transport conveyor 11 with respect to the direction of successive transport of the bagged products X towards the pick-up station P2. This shutter mechanism 40 is capable of king selectively opened and closed and is adapted to be driven in response to a signal issued from any one of the seal checker 20, the metal detector 31 and weigher 32. The shutter mechanism 40 cooperates with the seal checker 20, the metal detector 31 and weigher 32 to form a sorting mechanism for ejecting the bagged product X which has been deemed defective due to the presence an improper sealing of the bagged product X as detected by the seal checker 20, the containment of metallic matter in the bagged product X as detected by the metal detector 31, and/or the overweight or the underweight of the bagged product X.

The shutter mechanism 40 includes a pair of shutter plates 40a and 40b movably supported by respective portions of the machine side frame structures 1a and 1b adjacent a leading end of the fourth transport conveyor 11 with respect to the direction of successive transport of the bagged products X towards the pick-up station P2 for movement between a clear position, in which the shutter plates 40a and 40b are held clear from the transport path, and a block position in which the bagged product X being transported by the fourth transport conveyor 11 is blocked thereby. This shutter mechanism 40 also includes a shutter switching means comprised of drive cylinders 41a and 41b drivingly coupled with the respective shutter plates 40a and 40b and adapted to be actuated by air under pressure supplied through an electromagnetically operated valve 37 such as, for example, a solenoid actuated valve.

The seal checker 20, the metal detector 31 and the weigher 32 are electrically connected with a controller 35 which is in turn electrically connected with the electromagnetically operated valve 37 and which includes a determining means 36. The determining means 36 is operable to determine, based on the output signal supplied to the controller 35 from any one of the seal checker 20, the metal detector 31 and the weigher 32, whether or not the bagged product X being transported by the fourth transport conveyor 11 is improperly sealed, contains metallic matter and/or overweighed or underweight. In the event that the determining means 36 determines that the bagged product X is improperly sealed as detected by the seal checker 20, contains the metallic matter as detected by the metal detector 31 and/or is overweighed or underweight as detected by the weigher 32, the controller 35 generates an actuating signal to the electromagnetically operated valve 37 to cause the latter to supply air under pressure to the drive cylinders 41a and 41b. Then, the shutter plates 40a and 40b drivingly coupled with the respective drive cylinders 41a and 41b are held in the clear position or ejecting position, as shown by the solid line in FIG. 3, to thereby allow passage of such defective bagged product X therethrough so that the defective bagged product X can be ejected from the leading end of the fourth transport conveyor 11. On the other hand, in the absence of the actuating signal from the controller 35 due to the absence of the output signal from any one of the seal checker 20, the metal detector 31 and the weigher 32, the drive cylinders 41a and 41b are actuated to pivot the shutter plates 40a and 40b in respective directions as shown by the arrows in FIG. 3 towards a holding position. When the shutter plates 40a and 40b are brought to the holding position as shown by the phantom lines in FIG. 3, the passage of the bagged product X towards the leading end of the fourth transport conveyor 11 is blocked by the shutter plates 40a and 40b to prevent the bagged product X from being ejected, and the bagged product is held at the pick-up station P2 beneath the lifter mechanism 4.

The elevating mechanism 3 disposed beneath the fourth transport conveyor 11 and operable to shift the bagged product X, transported to the pick-up station P2, upwardly from below so that the upwardly shifted bagged product X can be picked up by the lifter mechanism 4, as shown in FIGS. 2 and 3, includes an elevating member 50 disposed below the conveyor belts 11c of the fourth transport conveyor 11 for movement up and down in a direction close towards and away from the conveyor belts 11c, and a drive cylinder 51 for moving the elevating member 50 selectively up and down. The elevating member 50 has a plurality of pusher plates 50a which, when the elevating member 50 is moved upwardly by the drive cylinder 51, protrude upwardly through spaces between the conveyor belts 11c to thereby carry the bagged product X upwardly from the fourth transport conveyor 11 so that the lifter mechanism 4 can readily pick up the bagged product X.

Figure 4:
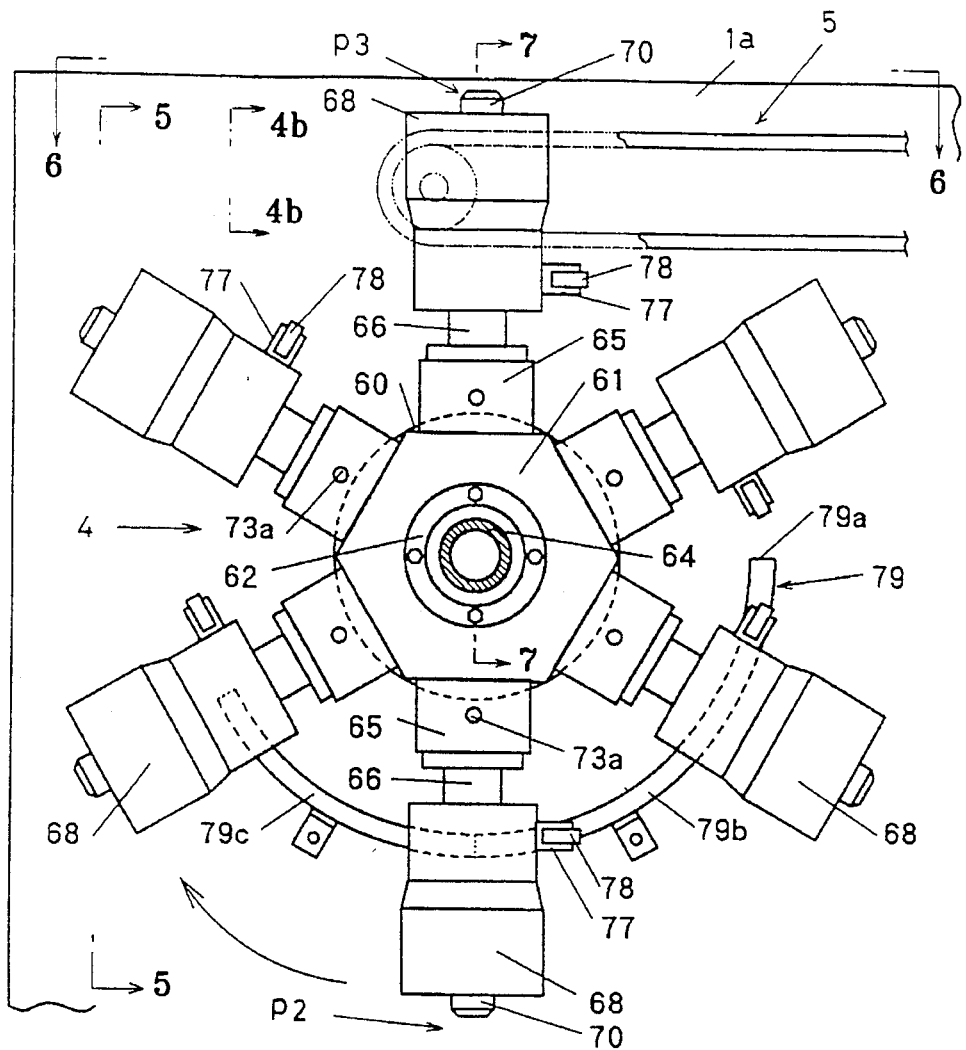
FIG. 4(a) is a fragmentary enlarged side view showing a lifter mechanism employed in the package transporting and loading system shown in FIG. 1.
FIG. 4(b) is a rear elevational view showing an upper portion of the lifter mechanism as viewed along the line 4b—4b in FIG. 4(a)
Figure 4:
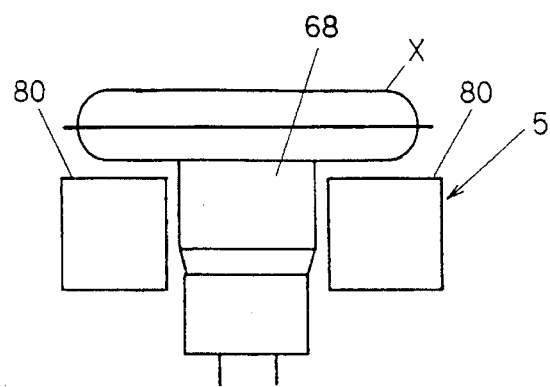
Figure 5:
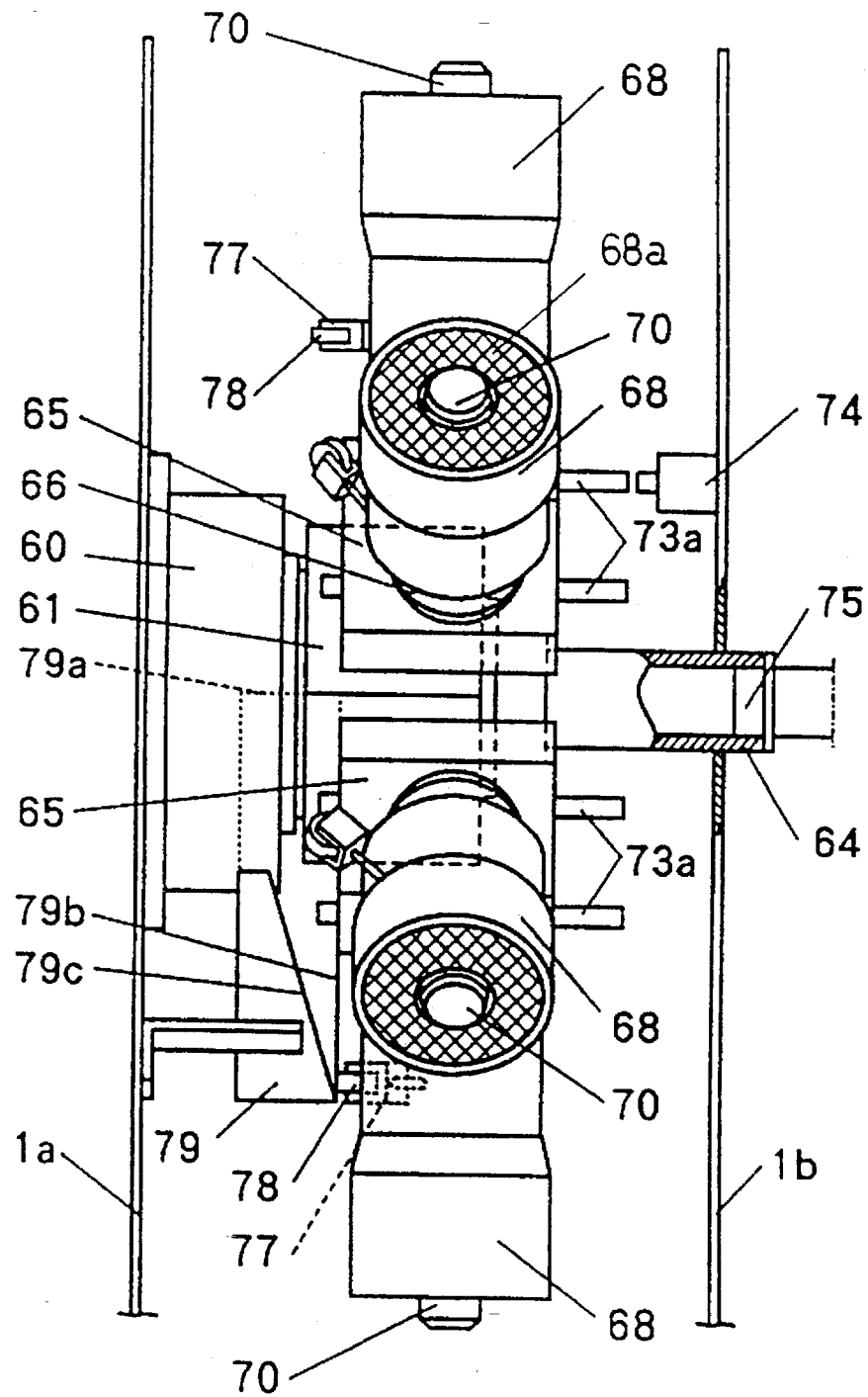
FIG. 5 is a rear elevational view of the lifter mechanism as viewed along the line 5—5 in FIG. 4(a)
Figure 6:
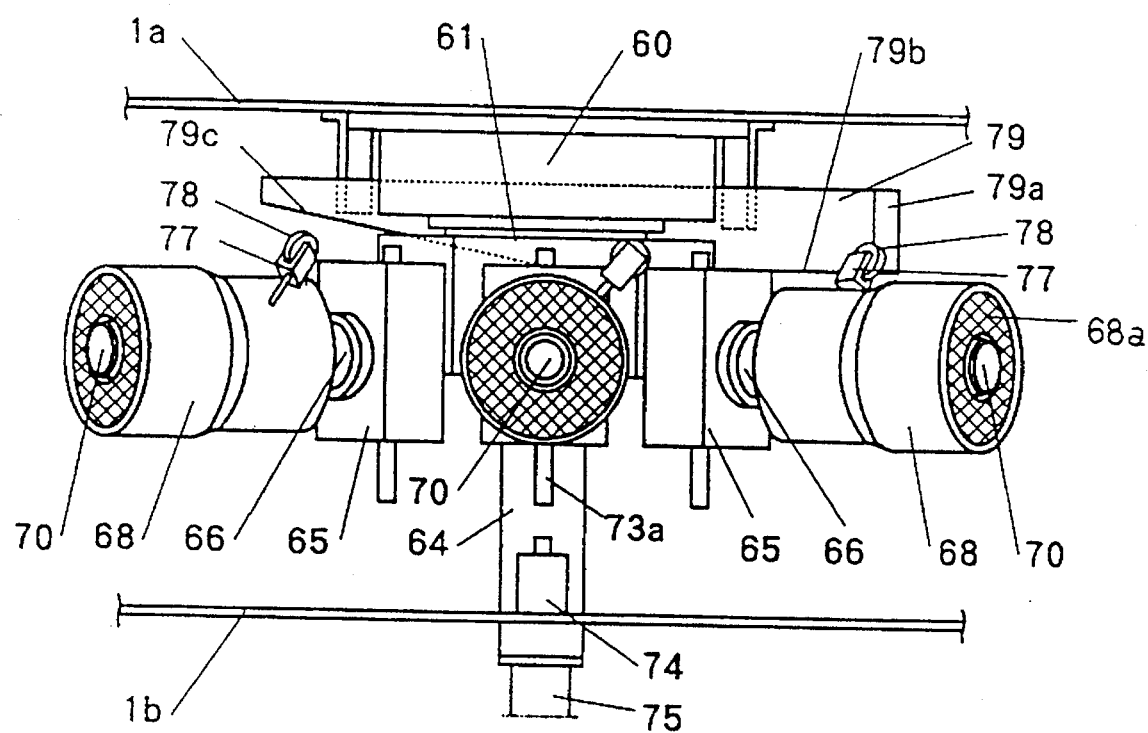
FIG. 6 is a plan view of the lifter mechanism as viewed along the line 6—6 in FIG. 4(a)
Figure 7:
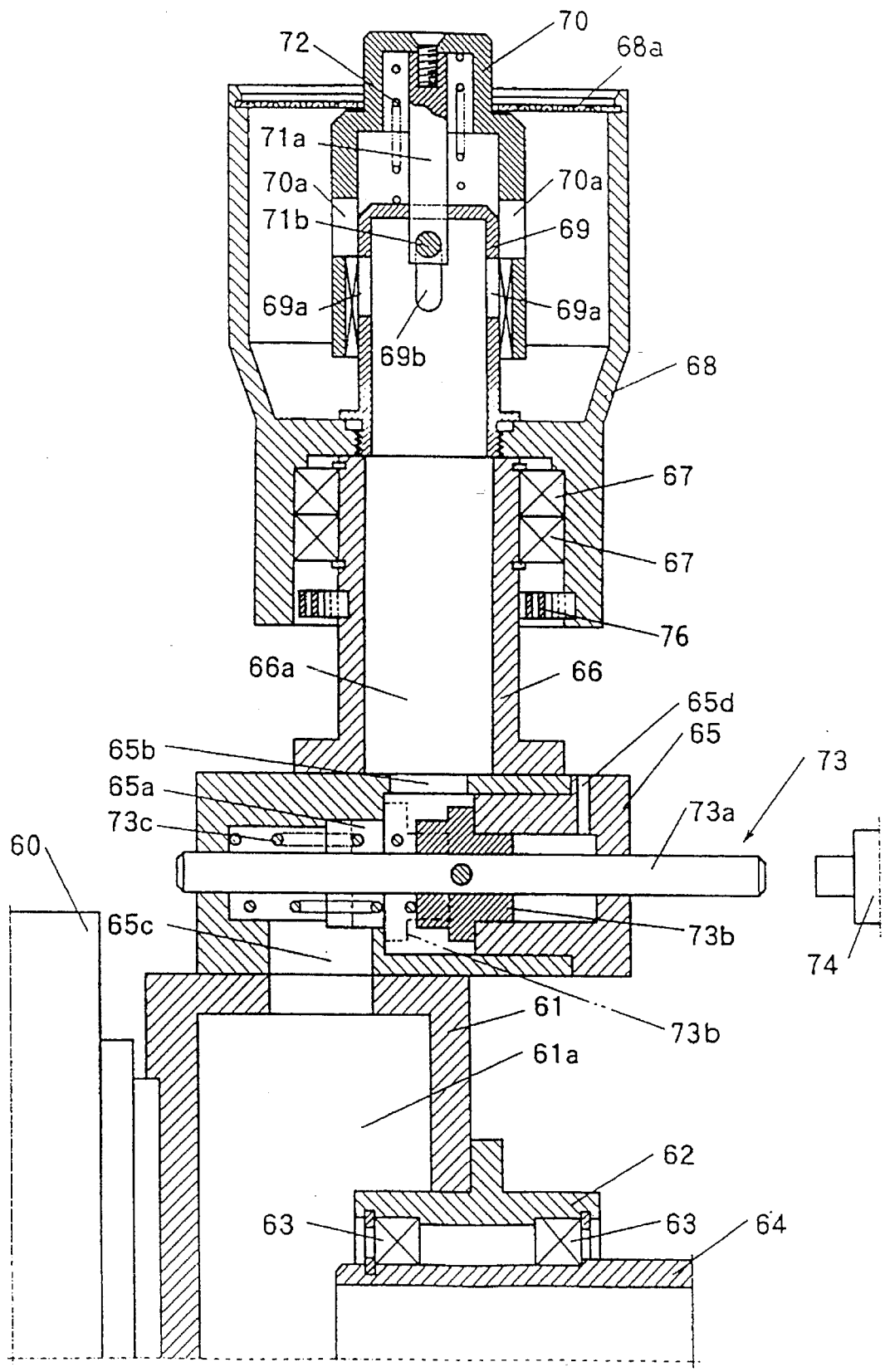
FIG. 7 is a fragmentary enlarged cross-sectional view of the lifter mechanism taken along the line 7—7 in FIG. 4(a)

The lifter mechanism 4 operable to successively pick up the bagged products X from the elevating mechanism 3 and then transfer them to the delivery station P3 will now be described in detail. As best shown in FIG. 4, the lifter mechanism 4 comprises an intermittently rotatably supported carousel 61 of a generally polygonal shape, for example, hexagonal, having a hollow 61a defined therein as shown in FIG. 7, and a drive means for intermittently rotating the carousel 61. As shown in FIGS. 5 and 6, the drive means for the carousel 61 includes a drive motor 60 secured to the machine side frame structure 1a and having a horizontally extending drive shaft on which the carousel 61 is mounted for rotation together therewith in one direction shown by the arrow in FIG. 4. The drive means drives the carousel 61 to rotate the latter intermittently at intervals of, for example, 60 degrees about the horizontal drive shaft of the drive motor 60.

The lifter mechanism 4 also comprises a tubular member 64 in FIG. 5 having one end rigidly secured to the machine side frame structure 1b so as to protrude outwardly therefrom and, as shown in FIG. 7, the opposite end portion inserted into a center bore in the carousel 61, a bearing housing 63 fixedly secured to a center portion of the carousel 61 and rotatably mounted on the tubular member 64 through bearings 63, a plurality of, for example, six, bases 65 secured to respective flanks of the carousel 61, a corresponding number of hollow arms 66 secured to the respective bases 65 so as to protrude radially outwardly from the carousel 61, holding elements or suction cups 68 each rotatably mounted on an outer free end of the corresponding hollow arm 66 through bearings 67 interposed between the respective suction cup 68 and an outer peripheral surface of the corresponding hollow arm 66. The suction cup 68 has a mesh member 68a through which suction force is exerted. The lifter mechanism 4 further comprises hollow cap members 69 each housed within the corresponding suction cup 68 and threadingly coupled thereto with its open end held in abutment with the outer free end of the corresponding hollow arm 66, and valve bodies 70 each mounted exteriorly on the corresponding cap member 69. It is to be noted that the hollow arms 66, the suction cups 68, the cap members 69 and valve bodies form a holding means employed in the present invention.

Each of the valve bodies 70 has one or more connecting passages 70a defined in the wall of the respective valve body 70 and also has a rod member 71a fixedly inserted into the respective cap member 69 so as to extend in alignment with the longitudinal axis of the respective cap member 69. The rod member 71a has a radial pin 71b secured thereto so as to extend perpendicular to the rod member 71a. Similarly, each of the cap members 69 is formed with a corresponding number of radial passages 69a and is also formed with a slot 69b for receiving therein the radial pin 71b rigid with the rod member 71a. A coil spring 72 is interposed between each cap member 69 and the associated valve body 70 for urging the associated valve body 70 in a direction away from the corresponding cap member 69 so that, when the valve body 70 is pressed towards the corresponding cap member 69 against a biasing force of the coil spring 72 with the radial pin 71b consequently brought into engagement with a lower end of the slot 69b in the cap member 69, the connecting passages 70a in the valve body 70 and the connecting passages 69a in the corresponding cap member 69 are communicated with each other to establish a pneumatic circuit between the hollow of the associated suction cup 68 and that of the corresponding cap member 69.

Each of the bases 65 has a hollow 65a defined therein and is formed with passages 65b and 65c which communicate the hollow 65a with the hollow 66a in the corresponding radial arm 66 and the hollow 61a in the carousel 61. Each base 65 is provided with a switching valve 73 including a rod member 73a extending through the respective base 65, a valve member 73b fixedly mounted on the rod member 73a and housed within the hollow 65a, and a coil spring 73c for biasing the valve member 73b in a predetermined direction. This switching valve 73 is so designed that, when the rod member 73a is pressed by an air cylinder 74 fitted to a predetermined portion of the machine side frame structure 1b, the valve member 73b assumes a closed position as shown by the phantom line in FIG. 7 to interrupt a communication between the connecting passages 65b and 65c.

It is to be noted that each of the bases 65 is also formed with a vent hole 65d for introducing air from the outside into the respective base 65 when the communication between the connecting passages 65b and 65c is interrupted by the switching valve 73 as described above.

As best shown in FIGS. 5 and 6, a free end portion of the tubular member 64 that protrude outwardly from the machine side frame structure 1b is communicated with a vacuum pump (not shown) through a conduit 75 so that the hollow 61a in the carousel 61 best shown in FIG. 7 is evacuated to a negative pressure and, therefore, when the switching valve 73 referred to above is switched to move the valve body 70 inwardly against the coil spring 72 to thereby communicate the passages 70a and 69a with each other, the interior of the suction cup 68 and the hollow 61a in the carousel 61 are communicated with each other to allow the corresponding suction cup 68 to hold the bagged product X under suction.

Also as best shown in FIG. 7, a spiral spring 76 is interposed between each suction cup 68 and the corresponding radial arm 66. Accordingly, when an external rotational force is applied around the longitudinal axis of the respective suction cup 68, the suction cup 68 rotates in one direction relative to the associated radial arm 66 with the spiral spring 76 accumulating a biasing force tending to rotate the suction cup 68 in the opposite direction, but when the external rotational force is removed from the suction cup 68, the suction cup 68 is rotated in the opposite direction by the action of the accumulated biasing force of the spiral spring 76 to return to the initial position. Each of the suction cup 68 is, as shown in FIG. 6, provided with a bracket 77 protruding radially outwardly from an outer peripheral surface of the respective suction cup 68 and rotatably carrying a roller 78.

Referring to FIG. 4, a generally arcuate guide member 79 is fixedly secured to an inner surface of the machine side frame structure 1a so as to encircle substantially halfway the drive motor 60 and is operable to rotate each suction cup 68 90 degrees about the longitudinal axis of the respective radial arm 66 against the biasing force of the spiral spring 76. As best shown in FIG. 5, this arcuate guide member 79 includes an end face area 79a adapted to contact the roller 78, carried by each suction cup 68 through the associated bracket 77, to rotate the associated suction cup 68 90 degrees about the longitudinal axis thereof, a top portion 79b for guiding the roller 78 while the associated suction cup 68 is held in position having been rotated 90 degrees about the longitudinal axis thereof, and a sloped area 79c operable to allow the suction cup 68 to progressively return to the initial position by the action of the associated spiral spring 76 (FIG. 7).

Thus, during the intermittent rotation of the carousel 61 with the suction cups 68 successively moving along a circular path around the carousel 61, the roller 78 carried by the associated suction cup 68 is brought into contact with the end face area 79a of the arcuate guide member 79 and, as the drive motor 60 is further driven to rotate the carousel 61 in a direction shown by an arrow in FIG. 4, the roller 78 carried by the associated suction cup 68 rides onto the top portion 79b of the arcuate guide member 79 allowing the associated suction cup 68 to be rotated 90 degrees about the longitudinal axis thereof against the biasing force of the corresponding spiral spring 76. As the carousel 61 is further driven by the drive motor 60 starting from the condition in which the suction cup 68 has been rotated 90 degrees about the longitudinal axis thereof against the biasing force of the corresponding spiral spring 76, the roller 78 rollingly move along the sloped area 79c allowing the respective suction cup 68 to be rotated 90 degrees in the opposite direction about the longitudinal axis thereof by the accumulated biasing force of the corresponding spiral spring 76 to assume the initial position.

In this way, the bagged product X which has been shifted upwardly from the pick-up station P2 by the elevating mechanism 3 and then held under suction by one of the suction cups 68 then brought to the pick-up station P2 is transferred towards the delivery station P3 by the rotation of the carousel 61. Consequent upon transfer of the bagged product X from the pick-up station P2 to the delivery station P3 by the lifter mechanism 4, the bagged product X which has been laid on the fourth transport conveyor 11 with its back face oriented upwardly is turned upside down with its back face oriented downwardly. Also, during the circular transfer of the bagged product X through 180 degrees from the pick-up station P2 to the delivery station P3 with the radial arms 66 circulating together with the carousel 61 in a vertical plane, each suction cup 68 is rotated 90 degrees about the longitudinal axis thereof and, therefore, not only is the bagged product X transported to the pick-up position P2 turned upside down as described above, but also swung 90 degrees about the longitudinal axis of the corresponding radial arm 66. As each suction cup 68 arrives at the delivery station P3, the suction force developed in the respective suction cup 68 is released to deliver the bagged product X from the respective suction cup 68 onto the second transport mechanism 5 as shown in FIG. 41b).

Figure 8:
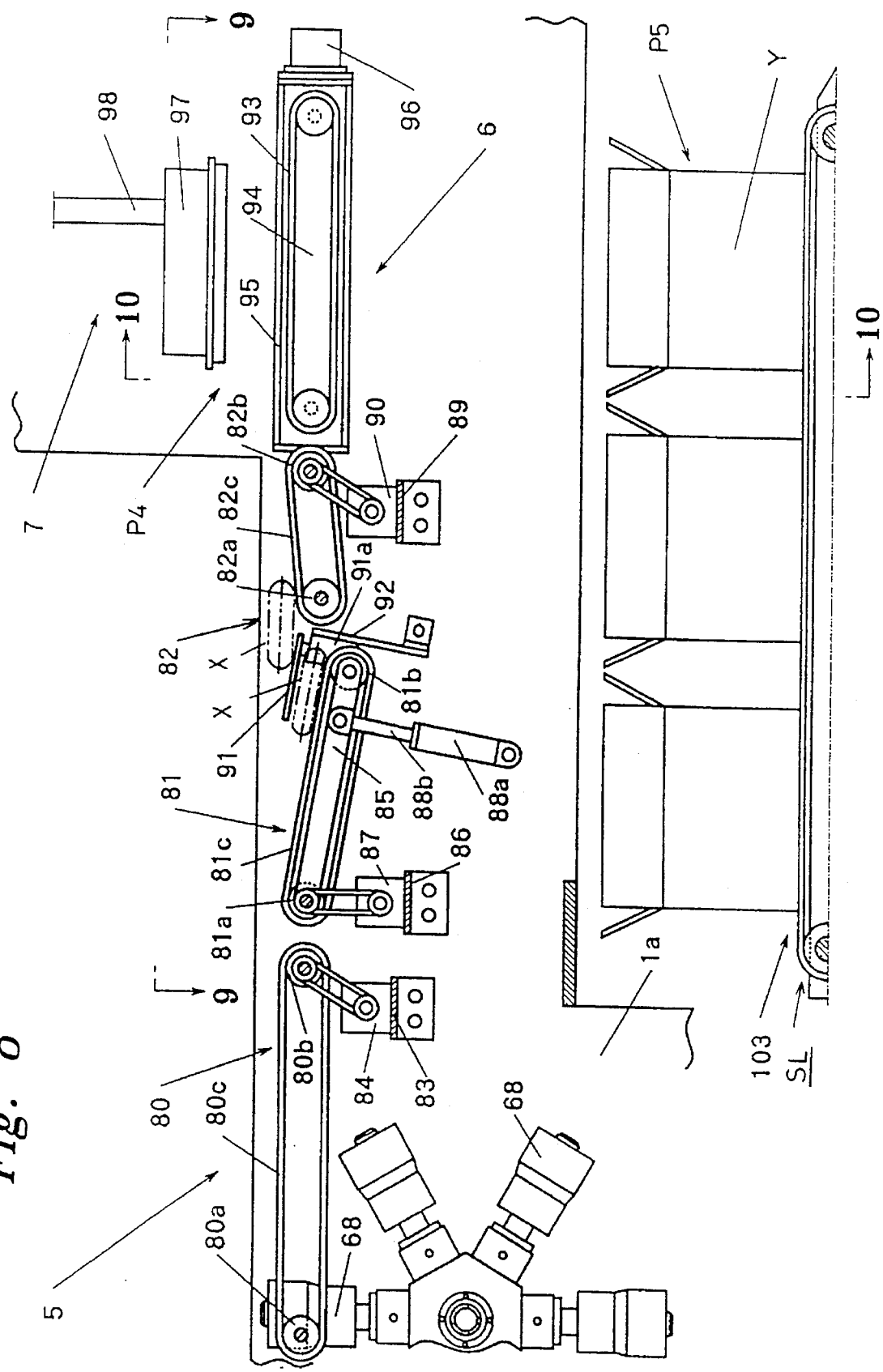
FIG. 8 is a fragmentary enlarged side view of the second transporting mechanism and a loading mechanism both employed in the package transporting and loading system of the present invention.
Figure 9:
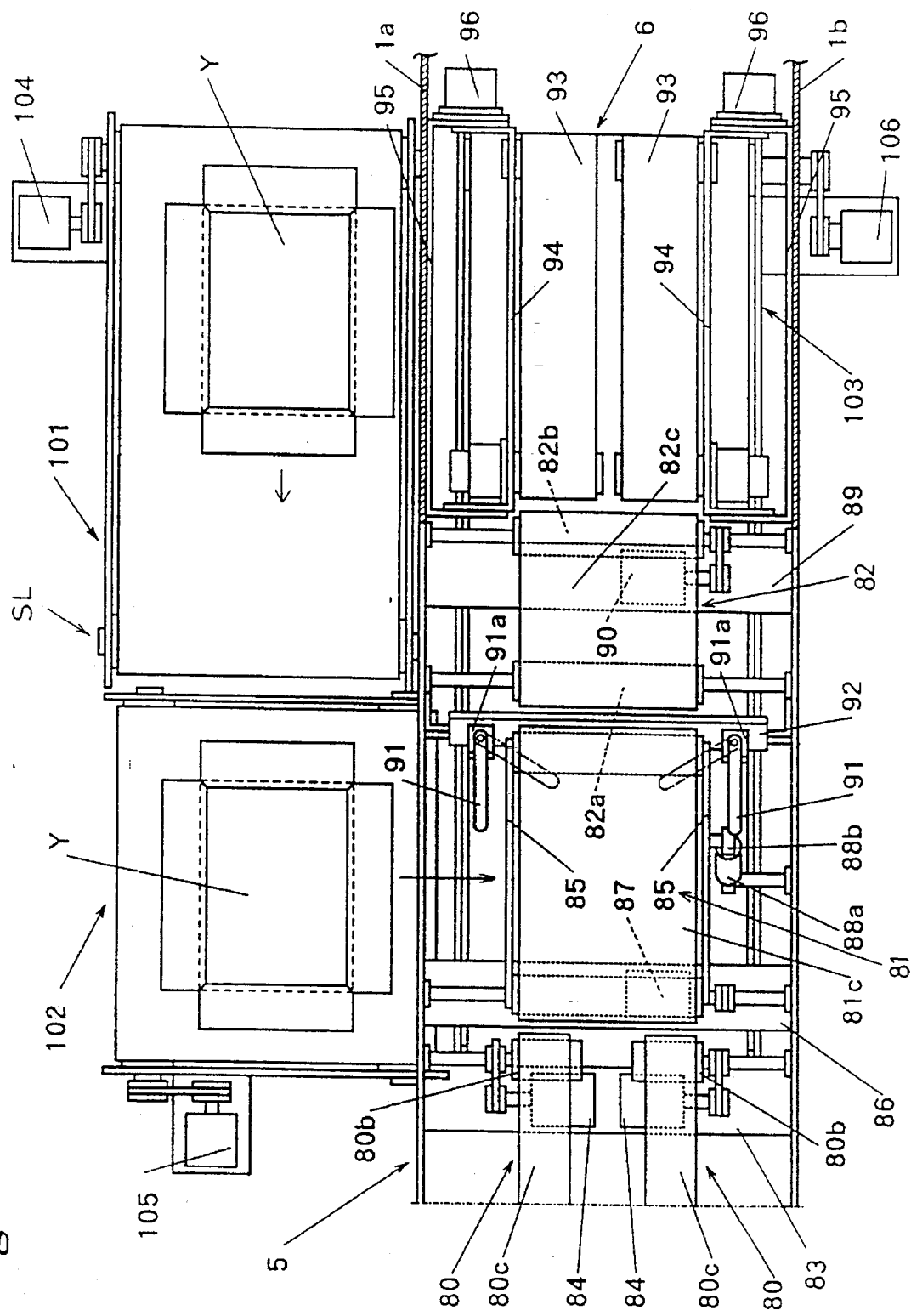
FIG. 9 is a fragmentary plan view as viewed along the line 9—9 in FIG. 8.

The bagged product X transferred to the delivery station P3 by the lifter mechanism 4 is subsequently transported to the stand-by station P4 by means of the second transport mechanism 5. This second transport mechanism 5 comprises, as shown in FIGS. 8 and 9, a pair of first transport conveyors 80 spaced such a distance from each other that the suction cups 68 can successively move in between the first transport conveyors 80, second and third transport conveyors 81 and 82. The first transport conveyors 80 includes a pair of rollers 80a and 80b rotatably supported between the machine side frame structures 1a and 1b, an endless conveyor belt 80c such as, for example, a timing belt, trained between the rollers 80a and 80b, and a drive motor 84 mounted fixedly on a mounting bracket 83 secured at opposite ends to the machine side frame structures 1a and 1b, said drive motor 84 being drivingly coupled with one of the rollers, for example, the roller 80b.

The second transport conveyor 81 of the second transport mechanism 5 includes a pair of rollers 81a and 81b rotatably supported on side brackets 85, respectively, an endless conveyor belt 81c such as, for example, a timing belt, trained between the rollers 81a and 81b, and a drive motor 87 mounted fixedly on a mounting bracket 86 secured at opposite ends to the machine side frame structures 1a and 1b, said drive motor 87 being drivingly coupled with one of the rollers, for example, the roller 81a. It is to be noted that only one of the rollers, that is, the roller 81a drivingly coupled with the drive motor 87 has its opposite ends rotatably supported by and between the machine side frame structures 1a and 1b. One of the brackets 85 is pivotally connected with a free end of a piston rod 88b protruding from a cylinder 88a which has a lower end rotatably connected to the machine side frame structure 1b, wherefore when the piston rod 88b projects from and retracts into the cylinder 88a, the second transport conveyor 81 as a whole can be pivoted up and down about the longitudinal axis of the roller 81a.

The third transport conveyor 82 of the second transport mechanism 5 is supported so as to upwardly incline at a predetermined angle from a position adjacent the second transport conveyor 81 towards the stand-by station P4. This third transport conveyor 82 includes a pair of rollers 82a and 82b rotatably supported between the machine side frame structures 1a and 1b, an endless conveyor belt 82c such as, for example, a timing belt, trained between the rollers 82a and 82b, and a drive motor 90 mounted fixedly on a mounting bracket 89 secured at opposite ends to the machine side frame structures 1a and 1b, said drive motor 89 being drivingly coupled with one of the rollers 82a and 82b so that the endless conveyor belt 82c can be intermittently driven by a predetermined stroke.

Positioned between the leading end of the second transport conveyor 81 and the trailing end of the third transport conveyor 82 is a pair of bar members 91 capable of being selectively opened and closed in response to the pivotal movement of the second transport conveyor 81, said pair of bar members 91 being cooperable with a stopper member 92. The bar members 91 are drivingly coupled with respective drive motors 91a so that the bar members 91 can be synchronously driven in a horizontal plane so as to assume one of closed and opened positions. Specifically, when the bagged product X being transported by the second transport conveyor 81 arrives at the leading end of the second transport conveyor 81 and is then shifted upwardly as a result of the pivotal movement of the second transport conveyor 81, the bar members 91 are brought to the closed position to support the bagged product X from below. When the third transport conveyor 82 is then intermittently driven by the predetermined stroke while the bagged product X resting on the leading end of the second transport conveyor 81 having been upwardly pivoted, the bagged product X is transported a predetermined distance by the third transport conveyor 82 towards the stand-by station P4. Thereafter, the second transport conveyor 81 is downwardly pivoted to return to the original position in readiness for the transport of the next succeeding bagged product X with its leading end crawling brought immediately beneath the preceding bagged product X then supported by the trailing end of the third transport conveyor 82. In this way, the third transport conveyor 82 is so driven by the drive motor 90 that a plurality of, for example, four, bagged products X can be, while partially overlapping one above the other, transported by the third transport conveyor 82 in a substantially linearly rectified fashion until these bagged products X are delivered to the stand-by station P4 by the third transport conveyor 82.

Figure 10:
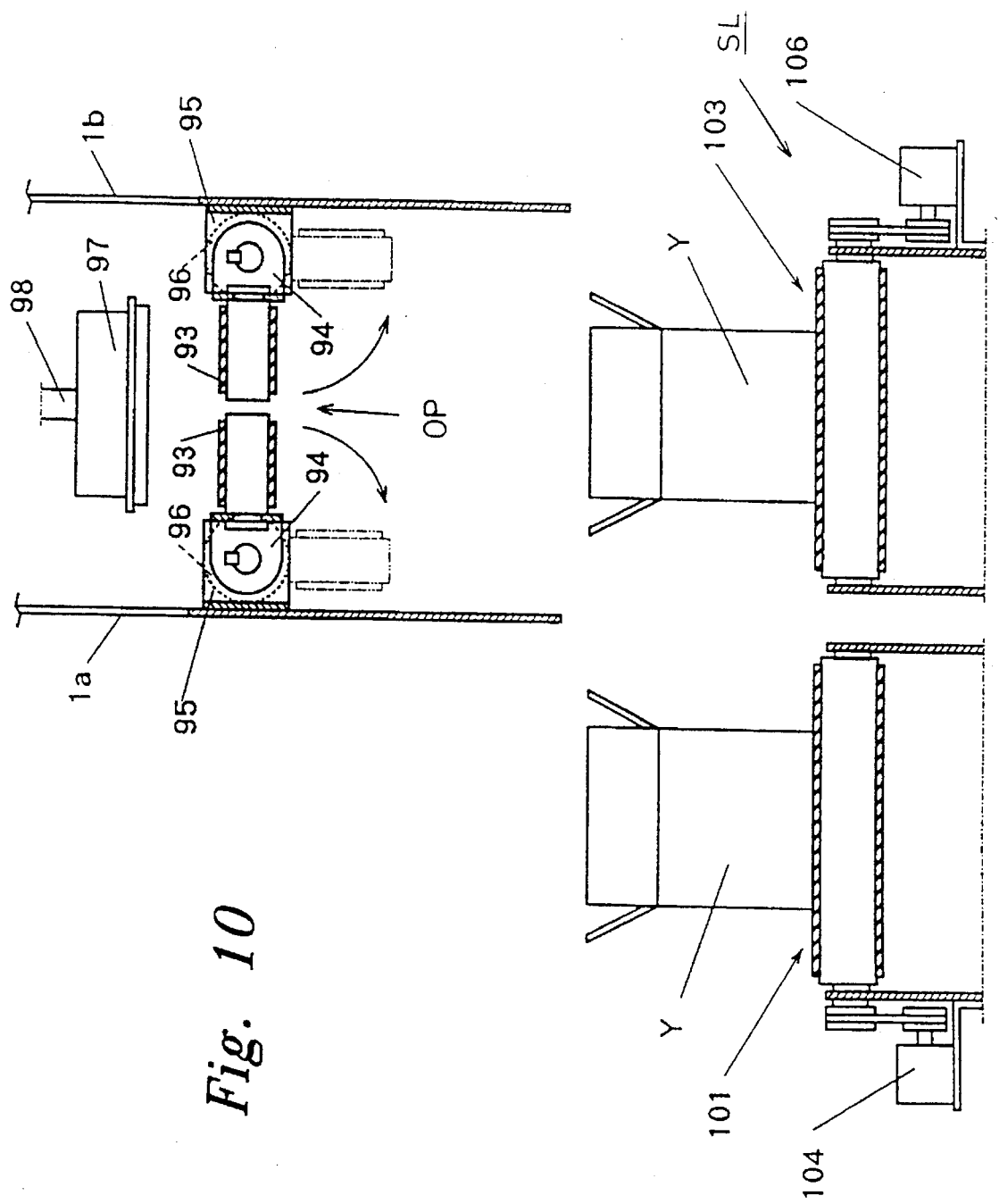
FIG. 10 is a fragmentary plan view as viewed along the line 10—10 in FIG. 8.
Figure 11:
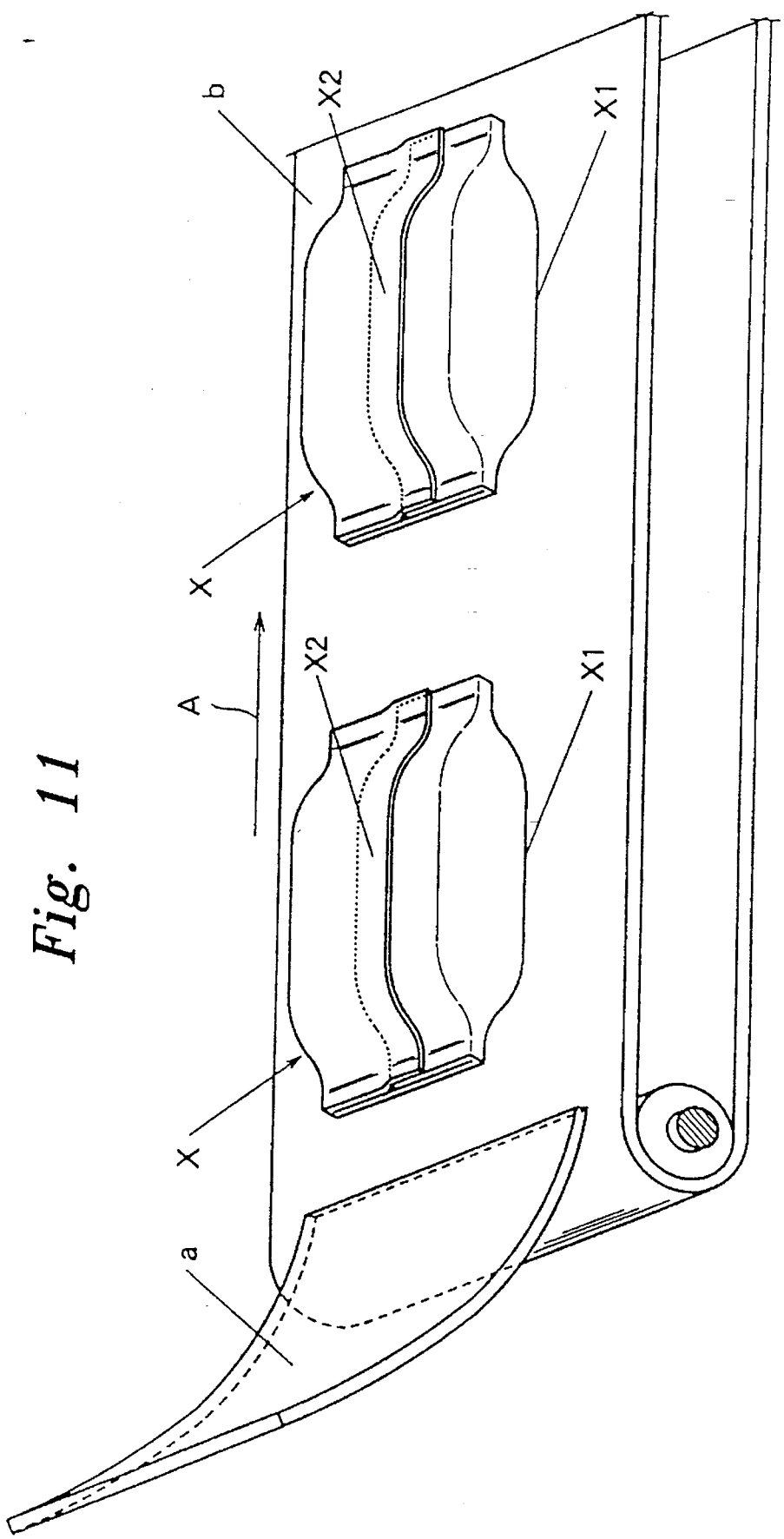
FIG. 11 is an explanatory diagram showing the manner in which bagged products are transported, which diagram is used to discuss the problems inherent in the prior art product transport system.

At the stand-by station P4, the receiving mechanism 6 for receiving passage of the bagged products X transported by the second transport mechanism 5 is disposed. As best shown in FIG. 9, this receiving mechanism 6 comprises a pair of transport conveyors 93 which are supported in a cantilever fashion by respective support brackets 94 as best shown in FIG. 10. The support brackets 94 are pivotally mounted on respective mounting brackets 95 which are in turn secured rigidly to the machine side frame structures 1a and 1b. The mounting brackets 95 have drive motors 96 fixedly mounted on respective ends thereof, which motors 96 are drivingly coupled with the support brackets 94 for movement between a horizontal or closed position, as shown by the solid lines in FIG. 10, and a vertical or open position as shown by the phantom lines in FIG. 10.

Referring to FIG. 8, the loader mechanism 7 is positioned at the upwardly shifted position P6 above the stand-by station P4 for sucking the bagged product X then blocked on the transport conveyors 93 forming parts of the receiving mechanism 6 and then to load the bagged products X into a carton box Y through an upper openings thereof, which box Y is held at the loading station P5 defined below the stand-by station P4. This loading mechanism 7 comprises, as best shown in FIG. 1, a suction head assembly 97, a pipe member 98 having a lower end rigidly connected with the suction head assembly 97, and a drive cylinder 100 having a piston rod operatively coupled with the pipe member 98 by a stay 99. The pipe member 98 is in turn fluid-coupled with a vacuum pump (not shown) so that, during the operation of the vacuum pump, the interior of the suction head assembly 97 can be evacuated to a negative pressure sufficient to pick the bagged products X up by the effect of a suction force. By the operation of the drive cylinder 100, the suction head assembly 97 can be selectively moved between the upwardly shifted position P6 and the loading station P5. Therefore, while the plural bagged products X are held under suction by the suction head assembly 97, and when the transport conveyors 93 are moved to the opened position in which they lie generally vertically as shown by the phantom lines in FIG. 10, the suction head assembly 97 is lowered through an opening OP formed by the transport conveyors 93 then moved to the opened position, whereby the plural bagged products X orderly held under suction by the suction head assembly 97 are loaded into the carton box Y, leaving the bagged products X within the carton box Y upon subsequent release of the suction force from the suction head assembly 97. After the bagged products X have been placed inside the carton box Y, the suction head assembly returns to the upwardly shifted position P6.

As shown in FIGS. 8 and 9, a box supply line SL including first to third transport conveyors 101 to 103 is arranged at the loading station P5 below the stand-by station P4, that is, the receiving mechanism 6, for successively supplying the carton boxes Y towards the loading station P5. Specifically, this box supply line SL extends from a position laterally outwardly from and below the second transport mechanism 5 and the receiving mechanism 6 to a position immediately below the second transport mechanism 5 and the receiving mechanism 6, and the first to third transport conveyors 101 to 103 are adapted to be driven by respective drive motors 104 to 106.

The package transporting and loading system 1 of the above described construction operates in the following manner.

The bagged products X successively delivered at the receiving station P1 from the packaging machine W are transported by the first to fourth transport conveyors 8 to 11, forming the first transport mechanism 2, towards the pick-up station P2. The bagged products X transported to the pick-up positions P2 are elevated by the elevating mechanism 3 so that the suction cups 68 of the lifter mechanism 4 can successively pick the bagged products X up by the effect of the suction force and then transfer them to the delivery station P3 at which the bagged products X are delivered onto the second transport mechanism 5.

The bagged products X delivered onto the second transport mechanism 5 at the delivery station P3 are subsequently transported by the first to third transport conveyors 80 to 82, forming the second transport mechanism 5, towards the stand-by station P4 immediately above the loading station P5 and are then temporarily received by the receiving mechanism 6. The bagged products X held at the stand-by station P4 by the receiving mechanism 6 are sucked by the suction head assembly 97 of the loading mechanism 7 positioned above the stand-by station P4. The suction head assembly 97 holding the bagged products X under suction is, after the transport conveyors 93 forming the receiving mechanism 6 are driven to the opened position, lowered to lead the bagged products X through the upper opening into the carton box Y, leaving the bagged products X inside the carton box Y in an orderly laid fashion.

When and after the number of the bagged products X loaded into the single carton box Y reaches a predetermined or required value, the filled carton box Y is transported outwardly from the loading station P5, the filled carton box Y being subsequently packaged or wrapped for shipment to the market.

As hereinabove described, with the package transporting and loading system 1 embodying the present invention, the bagged products X can be automatically loaded into a carton box Y in unit of a plural number in an orderly laid fashion. Accordingly, even though each bagged product is a sealed bag of light-weight items, for example, a sealed bag of potato chips, the bagged products can advantageously automatically loaded into the carton box Y or any other receptacle in the orderly laid fashion without any manual intervention, with the system as a whole consequently contributing to a remarkable improvement in work efficiency. This is equally apply even where each bagged product is of a kind hitherto considered it difficult to be automatically loaded into a box or any other receptacle in an orderly laid fashion or to be automatically loaded into a box or any other receptacle in a reliable fashion because, when it is allowed to slide along a chute Item the packaging machine towards the box or receptacle by the effect of a gravitational force, the bagged product being slid along the chute fail to assume a predetermined posture.

Also, the bagged products X transported by the first transport mechanism 2 from the receiving station P1 to the pick-up station P2 are successively transferred by the lifter mechanism 4 to the delivery station P3 defined above the pick-up station P2 and are subsequently transported by the second transport mechanism 5 towards the stand-by station P4 defined above the loading station P3 before they are loaded by the loading mechanism 7 into the carton box Y or any other receptacle held at the loading station P5. Accordingly, by the utilization of the packaging machine W and the package transporting and loading system 1, a series of packaging, transporting and loading the products to provide a box of the products can advantageously be automated.

Furthermore, the bagged products X discharged from the packaging machine W onto a position adjacent a ground floor after the products have been filled in the bags can be automatically loaded into the carton box Y or any other suitable receptacle held at the loading station P5 adjacent the ground floor, thereby dispensing with a need to place the packaging machine W high above the ground floor such as required where the packaged products X delivered from the packaging machine W onto the position adjacent the ground floor are supplied through the chute into the box or receptacle. Therefore, the automated production line from the manufacture of the bagged products X, by means of the packaging machine W, to the loading of the bagged products into the box or receptacle can be made compact in size without requiting a relatively large dedicated space for installation while allowing an improvement in layout of the production equipments.

In the illustrated embodiment of the present invention discussed hereinabove, the box supply line SL for successively supplying the carton boxes Y to the loading station P5 immediately below the stand-by station P4 extends from a position laterally outwardly from and below the second transport mechanism 5, which forms a path of transport of the bagged products X from the delivery station P3 to the stand-by station P4, and the receiving mechanism 6 to a position immediately below the second transport mechanism 5 and the receiving mechanism 6 so that the bagged products X can be loaded into each of the carton boxes Y which is held at the loading station P5. Accordingly, since a portion of the box supply line SL, is positioned immediately below the second transport mechanism 5 and the receiving mechanism 6, the distance over which the opposite portion of the box supply line SL protrudes laterally outwardly from and below the second transport mechanism 5 and the receiving mechanism 6 can advantageously be minimized, making the system as a whole compact in size and, hence, the dedicated space for installation can be minimized advantageously while the layout of the production equipments can also be improved.

Moreover, in the above described package transporting and loading system of the present invention, since each of the suction cups 68 forming parts of the lifter mechanism 4 as best shown in FIG. 4 undergoes a circular movement through 180 degrees in the vertical plane from the pick-up station P2 to the delivery station P3 as the carousel 61 driven by the drive motor 60 undergoes an intermittent rotation through the predetermined angle, for example, 60 degrees, depending on the number of the suction cups 68 carded thereby, each bagged product X transported to the pick-up station P2 and then sucked by the respective suction cups 68 is, during the transfer thereof from the pick-up station P2 to the delivery station P3, turned upside down with its back face oriented downwardly. Accordingly, even where the bagged products X are delivered onto the first transport mechanism 2 at the receiving station P1 in the form as having been turned upside down with its back face oriented upwardly, it is possible for the bagged products X to be eventually loaded into the carton box Y or any other receptacle automatically in an aesthetically acceptable manner in the form as turned with its front face oriented upwardly and, therefore, there is no need for the attendant worker to turn each bagged product upside down prior to the bagged product placed inside the box or any other receptacle, accompanied by an increase in work efficiency.

In addition, since each of the suction cups 68 is, during its circular movement through 180 degrees from the pick-up station P2 to the delivery station P3, turned 90 degrees about its own longitudinal axis by the roller 78 and the arcuate guide member 79, each bagged product X being transferred from the pick-up station P2 towards the delivery station P3 while being sucked by the corresponding suction cup 68 is also swung 90 degrees about the longitudinal axis of the corresponding suction cup 68. Accordingly, it is possible for the bagged products X to be automatically loaded into the carton box Y or any other receptacle, having been turned its orientation, making it possible for the bagged products X to be filled in the carton box Y or receptacle to suit to the varying size of the boxes or receptacles. This is particularly advantageous in that there is no need to use the boxes or receptacles of a relatively large capacity due to the orientation assumed by the bagged products to be loaded thereinto. Thus, the boxes or receptacles loaded with the bagged products X by the package transporting and loading system 1 of the present invention are indeed easy to handle during shipment. It is, however, to be noted that, where no 90 degree swinging of each bagged product is required, the arcuate guide member 97 and its associated parts may be dispensed with.

Again, the holding means comprised of the hollow arms 66, the suction cups 68, the cap members 69 and others includes a suction means for sucking the bagged products X by the effect of the suction force at the pick-up station P2 and for releasing the suction force to deliver the bagged products X onto the second transport mechanism 5 at the delivery station P3. Accordingly, the holding means used in the package transporting and loading system 1 of the present invention can be assembled compact and light-weight without substantially giving rise to damages to the bagged products which would often occur when the bagged products are manually handled.

The holding means referred to above also includes the carousel 61 driven by the drive means such as the drive motor 60, the plurality of the radial arms 66 protruding radially outwardly from the carousel 61 and holding elements, that is, the suction cups 68 operatively mounted on respective free ends of the radial arms 66 for sucking the corresponding bagged products X. Accordingly, the plural bagged products X can be carried by the corresponding holding elements, that is, suction cups 68, resulting in an improvement in work efficiency. Yet, since the holding means including the plural holding elements 68 is comprised of the carousel 61 and the radial arms 66, the structure is not only simple, but also light-weight as compared with the case in which the lifter mechanism is employed in the form of a belt device for transferring the bagged product from a lower position towards an upper position.

Furthermore, the loading station P5 is defined immediately below the stand-by station P4; the receiving mechanism 6 is so designed and so structured as to assume the closed position, in which the bagged products X are received at the stand-by station P4, and the opened position in which the bagged products X can be loaded into the carton box Y at the loading station P5 beneath the stand-by station P4; and the loading mechanism 7 is so structured and so designed as to move from the loading station P5 to the upwardly shifted position P6 while carrying the bagged products X under suction and then to move from the stand-by station P4 down to the loading station P5 to load the bagged products X into the carton box Y through the opening OP formed in the receiving mechanism 6 (FIG. 10). In this structure, since the bagged products X received by the receiving mechanism 6 can be loaded by the loading mechanism 7 into the box or receptacle positioned immediately below the loading mechanism 7 having been vertically lowered, there is no need for the bagged products X to be moved horizontally to bypass the receiving mechanism 6 and, therefore, the loading mechanism 7 performs a simple function or a linear movement with the work cycle consequently shortened. Also, even when the bagged product X once carried by the loading mechanism 7 is inadvertently dropped down, the bagged product X can fall into the box or receptacle and, therefore, there is no possibility that the number of the bagged products X loaded into the box or receptacle may become short of the predetermined or required number.

Yet, in the package transporting and loading system 1 of the type shown in and described with reference to the accompanying drawings, the seal checker 20, the metal detector 31 and the weigher 32 all disposed along the first transport path defined by the first to fourth transport conveyors 8 to 11 forming the first transport mechanism 2 and the shutter mechanism 40 disposed adjacent the leading end of the fourth transport conveyor 11 in the first transport path altogether form the sorting mechanism for sorting the bagged products X into acceptable and unacceptable products. Therefore, by the operation of the sorting mechanism, the presence or absence of some improperly sealed bagged products X, that of bagged products X containing metallic matter, and/or that of bagged products containing an insufficient or excessive quantity of products can be detected and, in accordance with this detection, the bagged products X can be assuredly sorted into the acceptable bagged products and the unacceptable bagged products, with only the acceptable bagged products being subsequently transported to the lifter mechanism 4 and then to the receiving mechanism 6 disposed at the stand-by station P4 by means of the second transport mechanism 5 before they are finally loaded into the carton box Y or any other receptacle. Thus, only the acceptable bagged products free from the defective seal, the containment of metallic matter and/or the insufficient or excessive weight can be successively loaded in unit of a plurality of bagged products X into the carton box Y or any other suitable receptacle, thereby increasing the quality and weight of the products packed in the carton box Y or any other suitable receptacle.

In addition, since the seal checker 20, the metal detector 31, the weigher 32 and the shutter mechanism 40, which altogether form the sorting mechanism referred to above, are disposed along the first transport path defined by the first transport mechanism 2 for transporting the bagged products from the receiving station PI to the pick-up station P2, the sorting mechanism as a whole can have a compact and aesthetically laid-out feature, occupying a minimized space for installation.

In particular, the containment of metallic matter in the bagged product X can be detected by the metal detector 31. Therefore, particularly in the case where the bagged products X contain food material, the unacceptable bagged product containing metallic matter can be assuredly ejected or removed, allowing only the acceptable bagged products to be placed inside the carton box Y or any other suitable receptacle, thereby ensuring the high quality of the bagged food products.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, the transport apparatus C comprised of the first transport mechanism 2, the second transport mechanism 5 and the filter mechanism 4 can equally be applied to any manufacturing facility other than the package transporting and loading system 1 described above, in which the products supplied onto a lower transport path should be transported successively to an upper transport path while permitting each product to be turned upside down during the transport thereof. In such an application the products may have not been packaged or bagged before supplied to the transport apparatus C.

Accordingly, such changes and modifications are, unless they depart from the scope of the present invention as delivered from the claims annexed hereto, to be construed as included therein.

What is claimed is:

1. A transport apparatus for transporting products, supplied onto a lower transport path, successively to an upper transport path, which apparatus comprises:

first transport means defining the first transport path and for transporting the products supplied at a first station towards a second station;

lifter means for holding the products, having been transported to the second station, and transferring the products from the second station towards a third station defined generally above the second station, said lifter means including holding means for holding the products transported to the second station and rotary drive means for rotating the holding means to turn the products upside down during the transfer of such products from the second station towards the third station;

second transport means for receiving the products, which have been transferred to the third station by the lifter means, and transporting the products towards a fourth station, said holding means including a carousel driven by the rotary drive means and having an axis of rotation, a plurality of radial arms disposed circumferentially with respect to the axis of rotation of the carousel and protruding radially outwardly from the carousel, a holding element mounted on a free end of each of the radial arms for holding the products, and suction means for sucking the products by a suction force at the second station and for releasing the suction force to deliver the products onto the second transport means at the third station, and an elevating mechanism for elevating products transported to the second station from below to the holding means, wherein the suction means comprises a suction cup foe sucking products and a valve adapted to be pressed by products elevated by the elevating mechanism to selectively open a negative pressure supplying passage for supplying negative pressure to the suction cup.

2. The transport apparatus as claimed in claim 1, wherein said second transport means includes a pair of transport conveyors positioned on respective sides of any one of the holding elements, which is positioned at the third station, for receiving the products when released from the respective holding element.

3. The transport apparatus as claimed in claim 1, wherein said holding means defines an axis of rotation and also includes swinging means for swinging each product 90 degrees about a longitudinal axis of the corresponding holding means perpendicular to the axis of rotation of the holding means during the transfer of the products from the second station towards the third station by the rotary drive means, whereby the products carried by the holding means are swung 90 degrees.

4. A package transporting and loading system for successively transporting bagged products and loading such bagged products into a receptacle, comprising:

first transport means defining a first transport path extending from a product receiving station to a pick-up station, said bagged products being delivered onto the first transport means at the receiving station;

lifter means for holding the products, having been transported to the pick-up station, and transferring the products from the pick-up station towards a delivery station defined generally above the pick-up station, said lifter means including holding means for holding the products transported to the pick-up station and rotary drive means for rotating the holding means to turn the products upside down during the transfer of such products from the pick-up station towards the delivery station, wherein said holding means includes a carousel driven by the rotary drive means and having an axis of rotation, a plurality of radial arms disposed circumferentially with respect to the axis of rotation of the carousel and protruding radially outwardly from the carousel, and a holding element mounted on a free end of each of the radial arms for holding the products;

second transport means defining a second transport path extending from the delivery station to a stand-by station, defined above a loading station, for transporting the products, which have been transferred to the delivery station by the lifter means, towards the stand-by station;

receiving means disposed at the stand-by station for receiving the bagged products transported by the second transport means; and loading means for holding the bagged products, received at the stand-by station by the receiving means, and then loading the bagged products into a receptacle positioned at a loading station, wherein said loading station is defined immediately below the stand-by station, and wherein said receiving means is capable of selectively assuming a closed position, in which the receiving means receives the bagged products at the stand-by station and an open position in which the bagged products are ready to be loaded into the receptacle held at the loading station immediately below the stand-by station, and wherein said loading means is operable to move between the loading station and an upwardly shifted position immediately above the stand-by station, said loading means being also operable to hold the bagged products at the stand-by station and then to load the bagged products from above into the receptacle at the loading station, having passed through an opening defined in the receiving means when the latter is in the open position.

5. The package transporting and loading system as claimed in claim 4, further comprising a receptacle supply line extending from a position laterally outwardly from and below the second transport path, defined by the second transport means, and the receiving means to a position immediately below the second transport path and the receiving means for successively supplying a plurality of receptacles one by one to the loading station.

6. A package transporting and loading system for successively transporting bagged products and loading such bagged products into a receptacle, which system comprises:

first transport means defining a first transport path extending from a product receiving station to a pick-up station, said bagged products being delivered onto the first transport means at the receiving station;

lifter means for holding the products, having been transported to the pick-up station, and transferring the products from the pick-up station towards a delivery station defined generally above the pick-up station, said lifter means including holding means for holding the products transported to the pick-up station and rotary drive means for rotating the holding means to turn the products upside down during the transfer of such products from the pick-up station towards the delivery station, wherein said holding means includes a carousel driven by the rotary drive means and having an axis of rotation, a plurality of radial arms disposed circumferentially with respect to the axis of rotation of the carousel and protruding radially outwardly from the carousel, and a holding element mounted on a free end of each of the radial arms for holding the products;

second transport means defining a second transport path extending from the delivery station to a stand-by station, defined above a loading station, for transporting the products, which have been transferred to the delivery station by the liter means, towards the stand-by station;

receiving means disposed at the stand-by station for receiving the bagged products transported by the second transport means;

loading means for holding the bagged products, blocked at the stand-by station by the receiving means, and then loading the bagged products into a receptacle positioned at a loading station, wherein said loading station is defined immediately below the stand-by station, and wherein said receiving means is capable of selectively assuming a closed position, in which the receiving means receives the bagged products at the stand-by station and an open position in Which the bagged products are ready to be loaded into the receptacle held at the loading station immediately below the stand-by station, and wherein said loading means is operable to move between the loading station and an upwardly shifted position immediately above the stand-by station, said loading means being also operable to hold the bagged products at the stand-by station and then to load the bagged products from above into the receptacle at the loading station, having passed through an opening defined in the receiving means when the latter is in the open position;

shutter means disposed at a location adjacent a leading end of the first transport path with respect to a direction of transport of the bagged products and capable of assuming one of an ejecting position, in which the bagged products are ejected from the first transport path, and a holding position in which the bagged products are retained on the first transport path;

at least one of an improperly bagged product detecting means for detecting some of the bagged products being transported along the first transport path, which are improperly bagged, weight detecting means for detecting some of the bagged products which contain an insufficient or excessive amount of products, and foreign matter detecting means for detecting containment of foreign matter in the bagged products, said at least one of the detecting means being disposed at a location along the first transport path; and shutter switching means for switching the shutter means over to the ejecting position when said at least one of the detecting means detects the improperly bagged product, the bagged product containing an insufficient or excessive amount of products or the bagged product containing the foreign matter.

7. The transport apparatus as claimed in claim 1, wherein said rotary drive means is operable to intermittently rotate said holding means from the second station to the third station by repeating rotation and stoppage.

* * * * *